United States Patent
Chen et al.

(10) Patent No.: US 11,036,460 B2
(45) Date of Patent: Jun. 15, 2021

(54) DEVICE AND METHOD FOR DETECTING AUDIO INTERFACE

(71) Applicant: Silicon Integrated Systems Corp., Hsinchu (TW)

(72) Inventors: Han-Ning Chen, Hsinchu (TW); Chien-Yu Chiang, Hsinchu (TW); Wen-Chi Lin, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 0 days.

(21) Appl. No.: 16/790,740

(22) Filed: Feb. 14, 2020

(65) Prior Publication Data

US 2020/0293265 A1 Sep. 17, 2020

(30) Foreign Application Priority Data

Feb. 15, 2019 (TW) .................. 10810519.9

(51) Int. Cl.
| | |
|---|---|
| *G06F 3/16* | (2006.01) |
| *H04B 14/02* | (2006.01) |
| *G06F 1/06* | (2006.01) |

(52) U.S. Cl.
CPC ............... *G06F 3/162* (2013.01); *G06F 1/06* (2013.01); *H04B 14/02* (2013.01)

(58) Field of Classification Search
CPC . G06F 1/06; G06F 13/00; G06F 13/10; G06F 13/14; G06F 13/38; G06F 13/382; G06F 13/385; G06F 13/387; G06F 13/42; G06F 13/4247; G06F 13/4256; G06F 13/4265; G06F 13/4269; G06F 13/4282; G06F 13/4286; G06F 13/4291; G06F 13/4295; G06F 3/16; G06F 3/162; G06F 3/165; G06F 3/167; G10L 19/167; G10L 19/173; G10L 19/18; G10L 19/20; G10L 19/22; G10L 19/24; H04B 14/02; H04B 14/023; H04B 14/026; H04B 14/04; H04B 14/042; H04B 14/044; H04B 7/17;

(Continued)

(56) References Cited

U.S. PATENT DOCUMENTS

| | | | | |
|---|---|---|---|---|
| 6,405,093 | B1* | 6/2002 | Malcolm, Jr. ........... | G06F 3/162 700/94 |
| 7,764,671 | B2* | 7/2010 | Tran .................... | H04N 21/4263 370/365 |
| 2009/0116475 | A1* | 5/2009 | Krzyzanowski ........ | G06F 15/16 370/352 |
| 2010/0272162 | A1* | 10/2010 | Simeon ................. | G06F 13/385 375/220 |
| 2013/0124763 | A1* | 5/2013 | Kessler ............... | G06F 13/4282 710/110 |
| 2013/0182850 | A1* | 7/2013 | Kruiskamp ......... | G06F 13/4291 381/1 |

(Continued)

*Primary Examiner* — Andrew C Flanders
(74) *Attorney, Agent, or Firm* — Mark M. Friedman

(57) ABSTRACT

A device for detecting an audio interface includes a processing unit, a first audio interface transmitting circuit, and a second audio interface transmitting circuit. The processing unit is utilized to generate a clock signal and a word select (WS) signal. The first audio interface transmitting circuit is utilized to generate a first audio data according to the clock signal. The second audio interface transmitting circuit is utilized to generate a second audio data according to the clock signal and the WS signal. The processing unit switches to the first audio interface transmitting circuit if a voltage potential of the WS signal remains at a high voltage level or remains at a low voltage level longer than a predetermined period. The processing unit switches to the second audio interface transmitting circuit if the voltage potential of the WS signal changes during the predetermined period.

8 Claims, 8 Drawing Sheets

(58) Field of Classification Search
CPC .... H04B 7/204; H04B 7/2043; H04B 7/2046; H04B 7/2048; H04B 7/212; H04B 7/2643; H04B 7/2671; H04L 1/0033; H04L 1/0034; H04L 1/0035; H04L 1/0036; H04L 1/0038; H04L 1/0039; H04L 12/40117; H04L 12/40169; H04L 2012/2849; H04L 29/00; H04L 7/00; H04L 7/008; H04R 2203/00; H04R 2410/00; H04R 2420/01; H04R 2420/03; H04R 2420/05; H04R 2420/07; H04R 2420/09; H04R 29/00; H04R 29/004; H04R 29/005; H04R 29/006; H04R 29/007; H04R 3/00; H04R 3/005; H04R 3/12; H04R 3/14

See application file for complete search history.

(56) References Cited

U.S. PATENT DOCUMENTS

| | | | |
|---|---|---|---|
| 2013/0322439 A1* | 12/2013 | Verhallen | H04J 3/12 |
| | | | 370/389 |
| 2013/0322461 A1* | 12/2013 | Poulsen | H04L 12/40169 |
| | | | 370/458 |
| 2014/0254837 A1* | 9/2014 | Mortensen | H03F 3/68 |
| | | | 381/120 |
| 2016/0322056 A1* | 11/2016 | Yamashita | G11B 20/00007 |
| 2016/0358617 A1* | 12/2016 | Lesso | H04L 25/4902 |
| 2017/0220502 A1* | 8/2017 | Kessler | G06F 13/404 |
| 2018/0317009 A1* | 11/2018 | Feld | H04R 27/00 |
| 2020/0106224 A1* | 4/2020 | Felder | H01R 24/28 |
| 2020/0257627 A1* | 8/2020 | Chamarty | G06F 12/0811 |

\* cited by examiner

DEVICE AND METHOD FOR DETECTING AUDIO INTERFACE

FIELD OF INVENTION

The present disclosure relates to a device and a method for detecting audio interface, particularly to a detecting circuit and method for detecting and automatically switching audio transmission interface.

BACKGROUND OF INVENTION

There are various audio transmission protocols of digital microphones (DMICs) on the market currently. The audio transmission protocols include pulse density modulation (PDM) protocol, inter-integrated circuit sound (inter-IC sound, S) audio transmission protocol, time division multiplexing (TDM) protocol, and other audio transmission protocols for DMICs.

Please refer to FIG. 1, which illustrates pins of an I2S audio chip. The US audio chip 12 includes a serial clock (SCK) pin, a word select (W_S) pin, a left right (LR) pin, a serial data (SD) pin, a high voltage potential VDD, and a low voltage potential GND.

I2S audio transmission protocol uses two chips to divide audio data into two sets of data of left channel and right channel, which are transmitted sequentially. The SCK pin is connected to a bit clock line to receive clock signals. The W_S pin determines whether the audio data is transmitted from the left channel or the right channel. The LR pin is used to select whether the audio data processed by the chips is from the left channel or the right channel. When the LR pin is connected to ground GNU, it means that the left channel is selected, and when the LR pin is connected to the high potential VDD, it means that the right channel is selected. The audio data can be directly transmitted to a processing unit through the SD pin of the chip because the W_S pin can determine whether transmitted sequence signals are from the left channel or the right channel. No additional audio decoder is needed to decode the transmitted audio data.

Please refer to FIG. 2, which illustrates pins of a PDM audio chip. The PDM audio chip 14 includes a clock (CLK) pin, a left right (LR) pin, a data output (DOUT) pin, a high voltage potential VDD, and a low voltage potential GND. In PDM audio data streaming, only the CLK pin and the LR pin are required for receiving clock signals and selecting right or left channels, respectively, accompanied by the high voltage potential VDD and the low voltage potential GND as reference potential. Audio data is output to a processing unit via the DOUT pin. Therefore, PDM audio transmission has advantages of simpler circuit and less transmitting signals.

Please refer to FIG. 3, which illustrates pins of a TDM audio chip. The TDM audio chip 16 includes a serial clock (SCK) pin, a word select (W_S) pin, a configure (CONFIG) pin, a serial data (SD) pin, a high voltage potential VDD, and a low voltage potential GND. The TDM audio transmission protocol also requires the SCK, the W_S, and the SD pins. In addition, it further requires a word select output (WSO) pin to connect a series of TDM chips. A word select (WS) signal of a chip of a present stage is transmitted to a W_S pin of a next chip via the WSO pin. TDM chips can connect up to 16 chips in series by daisy chain topology. That is, TDM audio transmission protocol can transmit audio data simultaneously through 16 channels at most.

I2S transmission protocol has an advantage of no decoder required, but it can only transmit audio data via two channels. PDM transmission protocol has advantages of simpler circuit and signals, but it requires a decoder to decode audio data. TDM transmission protocol can connect 1 to 16 chips in series according to requirement, but it requires more pins. Therefore, when different transmission protocols have their own advantages and disadvantages, DMICs usually have three interfaces to process these three types of transmission protocols. Thus, manufacturing cost is high because three packages are required for three individual audio transmission protocols.

Therefore, a device and a method for automatically detecting transmitting audio protocol and for automatically switching to a correct audio transmission interface to transmit audio data are needed.

SUMMARY OF INVENTION

The present disclosure provides a device for detecting audio interface including a processing unit, a first audio interface transmitting circuit, a second audio interface transmitting circuit, and a detecting unit. A processing unit is configured to generate a clock signal and a word select signal. A first audio interface transmitting circuit is configured to generate a first audio data according to the clock signal and is configured to transmit the first audio data to the processing unit in a first transmission protocol. A second audio interface transmitting circuit is configured to generate a second audio data according to the clock signal and the word select signal and is configured to transmit the second audio data to the processing unit in a second transmission protocol. A detecting unit is configured to generate a detecting result according to the word select signal. The detecting result is the first transmission protocol and the processing unit is switched to the first audio interface transmitting circuit in response to the word select signal being at a low voltage potential for a predetermined period or in response to the word select signal being at a high voltage potential for the predetermined period. The detecting result is the second transmission protocol and the processing unit is switched to the second audio interface transmitting circuit in response to a voltage potential of the word select signal changing in the predetermined period.

Preferably, the device for detecting audio interface further including a third audio interface transmitting circuit configured to generate a third audio data according to the clock signal and the word select signal and to transit the third audio data to the processing unit in a third transmission protocol. The detecting result is the third transmission protocol and the processing unit is switched to the third audio interface transmitting circuit in response to that two adjacent rising edges or two adjacent falling edges of the word select signal are spaced for 64 clocks and the word select signal is keeping the high voltage potential for 32 clocks. The detecting result is the second transmission protocol and the processing unit is switched to the second audio interface transmitting circuit in response to that the two adjacent rising edges or the two adjacent falling edges of the word select signal are spaced for 64 clocks and the word select signal is not keeping the high voltage potential for 32 clocks. The detecting result is the second transmission protocol and the processing unit is switched to the second audio interface transmitting circuit in response to that the two adjacent rising edges or the two adjacent falling edges of the word select signal are not spaced for 64 clocks.

Preferably, the first protocol is pulse density modulation and the second protocol is time division multiplexing.

Preferably, the third protocol is inter-integrated-circuit (inter-IC) sound transmission.

Preferably, the predetermined period is 512 clocks.

The present disclosure further provides a method for detecting audio interface by detecting a word select signal generated by a processing unit which includes step one to step four. Step one: detecting the word select signal. Step two: determining whether a voltage potential of the word select signal maintains constant for a predetermined period, and implementing a step three if yes or implementing a step fourth if no. The step three: switching an audio interface of the processing unit to a first audio interface transmitting circuit. The step four: switching the audio interface of the processing unit to a second audio interface transmitting circuit.

Preferably, the method for detecting audio interface further includes determining whether two adjacent rising edges of the word select signal are spaced for 64 clocks or two adjacent falling edges of the word select signal are spaced for 64 clocks, and if yes and the word select signal is keeping a high voltage potential for 32 clocks, switching the audio interface of the processing unit to a third audio interface transmitting circuit, otherwise switching the audio interface of the processing unit to the second audio interface transmitting circuit.

Preferably, the first audio interface transmitting circuit is pulse density modulation circuit and the second audio interface transmitting circuit is time division multiplexing circuit.

Preferably, the third audio interface transmitting circuit is inter-integrated-circuit (inter-IC) sound transmission.

Preferably, the predetermined period is 512 clocks.

The present disclosure makes use of detecting word select signal's different potential characteristics in different audio transmission protocols to detect the type of audio transmission protocol through which the audio data received by the processing unit is transmitted, so that the processing unit can automatically switch to the corresponding audio interface to process the received audio data. In comparison with the conventional audio technologies which require different processing circuits to transmit and receive audio data, the device and method for detecting audio interface of the present disclosure require only one type of the processing unit to simultaneously process audio data transmitted by multiple transmission protocols. Hence, packaging processes and manufacturing cost of audio devices are reduced

DETAILED DESCRIPTION OF PREFERRED EMBODIMENTS

Figure 1:
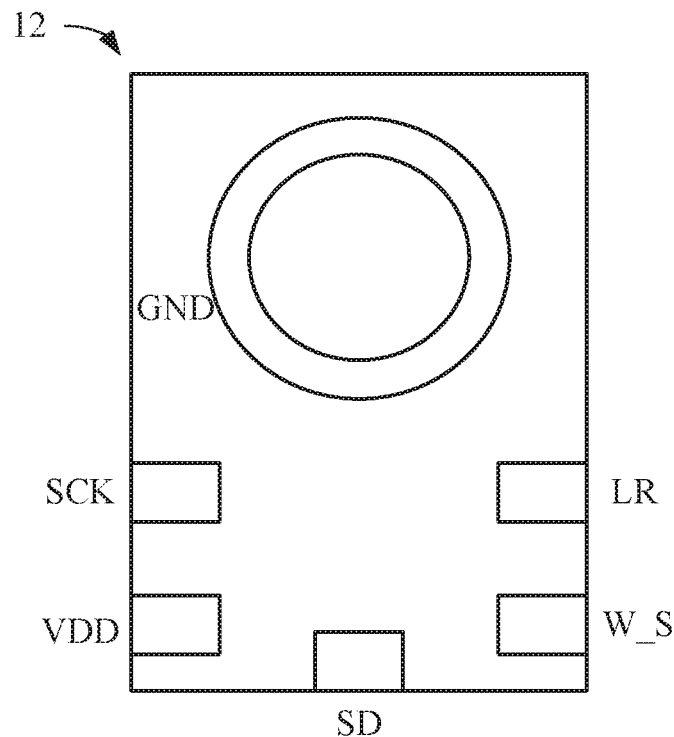
FIG. 1 illustrates a schematic diagram of pins of an inter-integrated circuit sound (inter-IC sound, I2S) audio chip.
Figure 2:
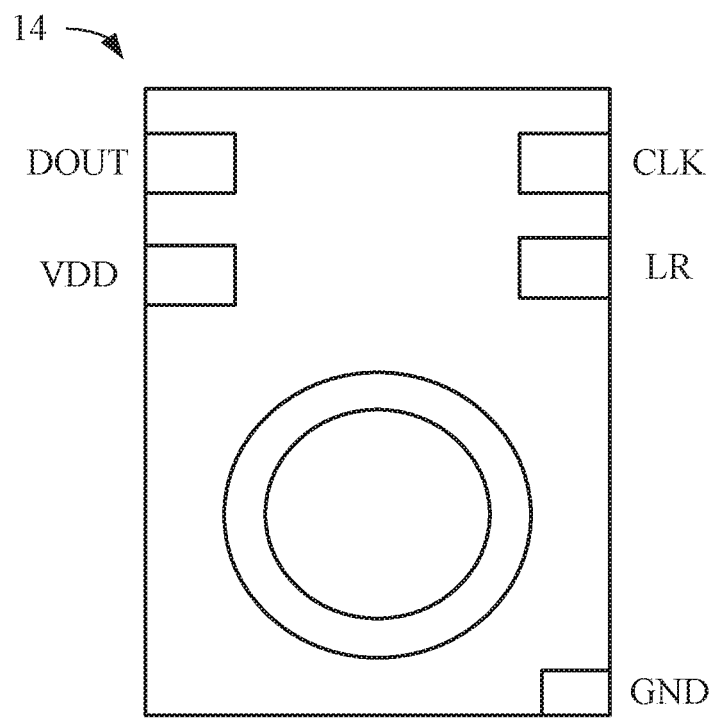
FIG. 2 illustrates a schematic diagram of a pulse density modulation (PDM) audio chip.
Figure 3:
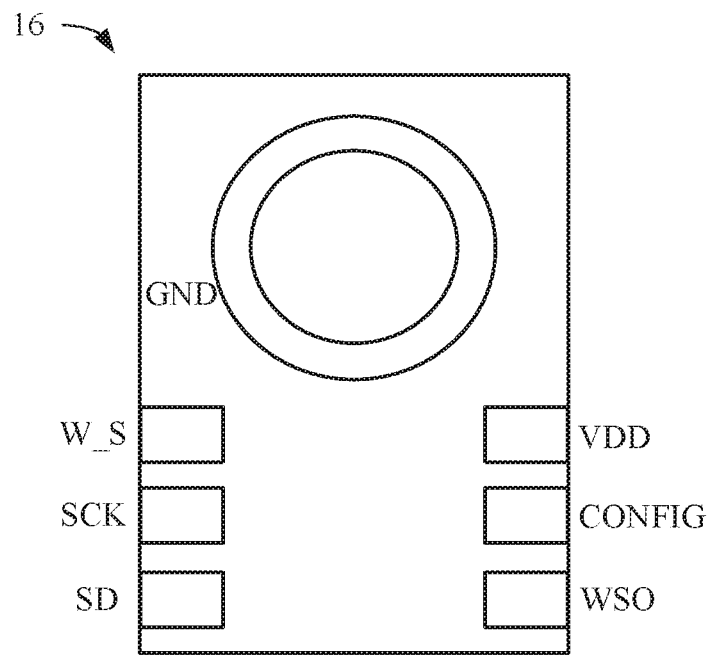
FIG. 3 illustrates a schematic diagram of a time division multiplexing (TDM) audio chip.

The following description of the various embodiments is provided with reference of drawings to illustrate specific embodiments. Directional terms mentioned in the present disclosure, such as upper, lower, top, bottom, front, back, left, right, inside, outside, lateral, peripheral, central, horizontal, vertical, longitudinal, axial, radial, etc., are only referring to the direction of the drawing. Therefore, the directional terms used to describe and clarify the present disclosure should not be viewed as limitations of the present disclosure.

Figure 4:
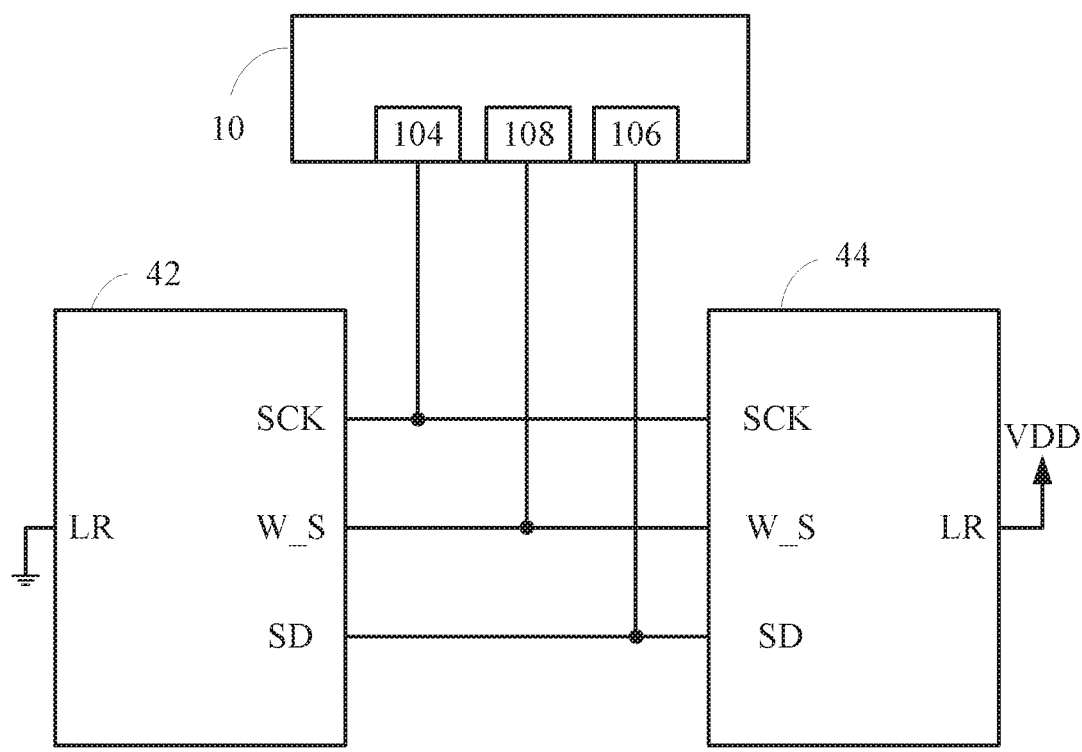
FIG. 4 illustrates a schematic diagram of an I2S transmission circuit.

Please refer to FIG. 4, which illustrates a schematic diagram of an inter-integrated circuit sound (inter-IC sound, I2S) transmission circuit. As shown in FIG. 4, the I2S transmission circuit includes a processing unit 10 and two I2S audio chips 42 and 44. The processing unit 10 includes a clock signal port 104, an audio data port 106, and a word select (W_S) port 108. The clock signal port 104 transmits clock signals to the I2S audio chips 42 and 44. In the embodiment of the present disclosure, the LR pin of the I2S audio chip 42 is connected to a low potential, and the LR pin of the I2S audio chip 44 is connected to a high potential. Therefore, the I2S audio chips 42 and 44 process the audio data of the left channel and the tight channel, respectively.

Figure 5:
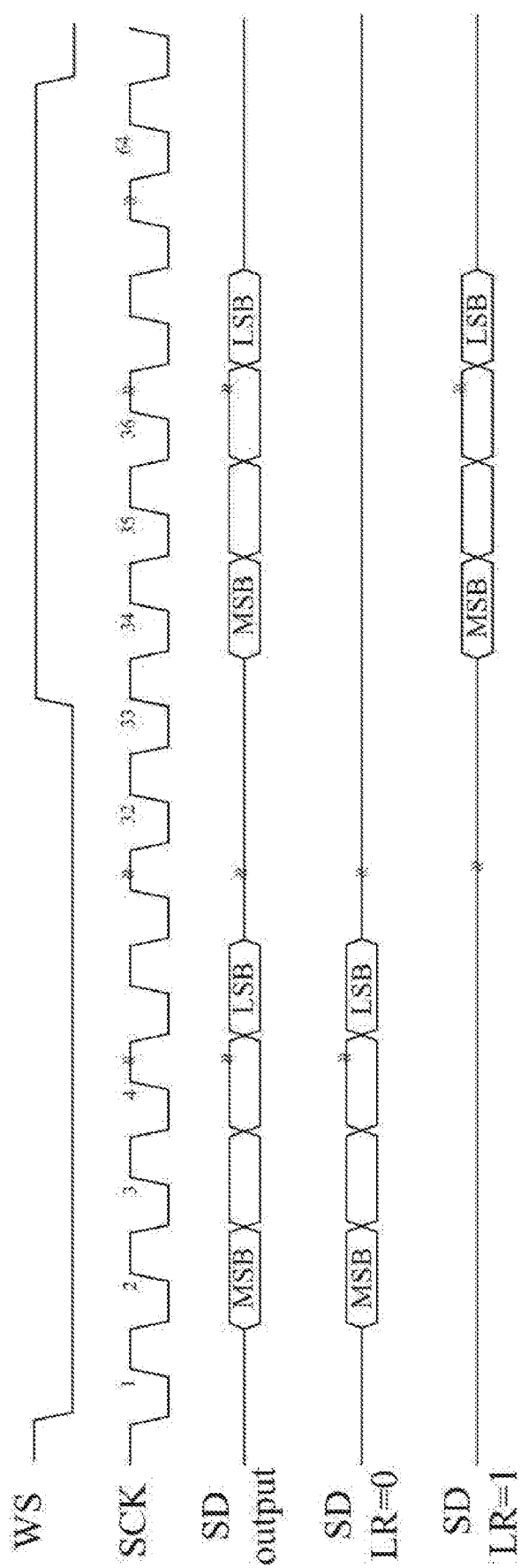
FIG. 5 illustrates a signal sequence diagram of the I2S transmission circuit shown in FIG. 4.

Please refer to FIG. 5, which illustrates a signal sequence diagram of the I2S transmission circuit shown in FIG. 4. The I2S transmission circuit includes two I2S audio chips 42 and 44, and a processing unit 10. A clock signal port 104 and a W_S port 108 of the processing unit 10 respectively transmit clock signals SCK and word select signals WS to the I2S audio chips 42 and 44. The I2S audio chips 42 and 42 respectively output timing data. SD (LR=0) and timing data. SD (LR=1), A start and an end of the timing serial data are a most significant bit (MSB) and a least significant unit (LSB), respectively. The word select signal WS determines whether to receive audio data from the left channel or the right channel. As shown in FIG. 5, the word select signal WS is at a low voltage potential during the first 32 clocks, while the LR pin receives a low voltage potential so that the low-potential I2S audio chip 42 outputs a valid (i.e. 1) signal. The word select signal WS is at a high potential for the next 32 clocks, while the LR pin receives a high voltage potential so that the high-potential I2S audio chip 44 outputs a valid (i.e. 1) signal. Therefore, an audio data port 106 of the processing unit 10 receives audio data from the left channel during the first 32 clocks, and receives audio data from the right channel during the 33rd to 64th clocks.

Figure 6:
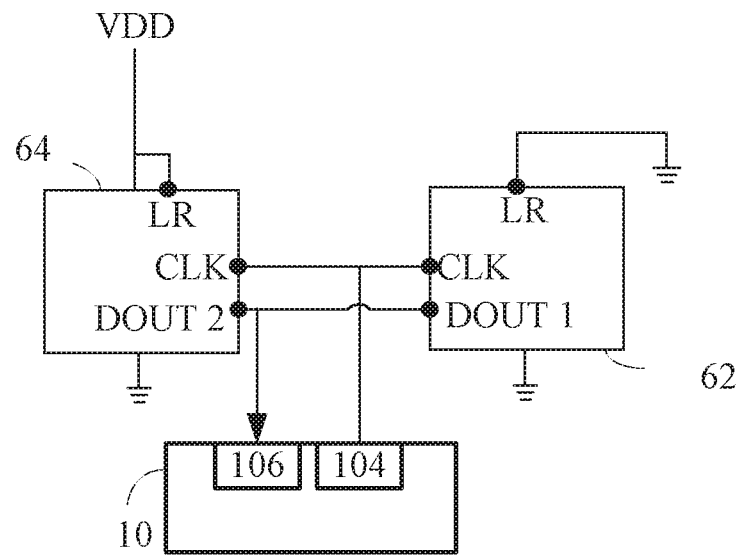
FIG. 6 illustrates a schematic diagram of a PDM transmission circuit.

FIG. 6 illustrates a schematic diagram of a pulse density modulation (PDM) transmission circuit. The PDM transmission circuit includes a processing unit 10 and PDM audio chips 62 and 64. A clock signal port 104 of the processing unit 10 transmits clock signals SCK to CLK pins of the PDM audio chips 62 and 64, The PDM audio chips 62 and 64 output audio data DOUT1 and DOUT2 according to the clock signals SCK.

Figure 7:
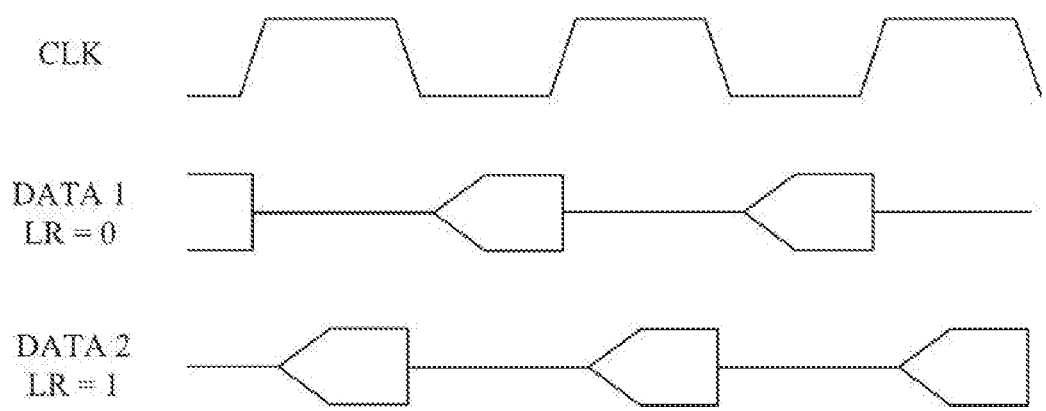
FIG. 7 illustrates a signal sequence diagram of the PDM transmission circuit shown in FIG. 6.

Please refer to FIG. 7, which illustrates a signal sequence diagram of the PDM transmission circuit shown in FIG. 6. Because the LR pin of the PDM audio chip 62 receives a low potential and the LR pin of the PDM audio chip 64 receives a high potential, the PDM audio chip 62 outputs valid (i.e. 1) audio data DOUT1 when the clock signal SCK is at a low voltage potential, and the PDM audio chip 64 outputs valid (i.e, 1) audio data DOUT2 when the clock signal SCK is at a high voltage potential. Therefore, when using PDM audio transmission protocol for transmission, there is no need for the word select signal WS as required by the I2S audio protocol to determine which channel transmits valid audio data.

Figure 8:
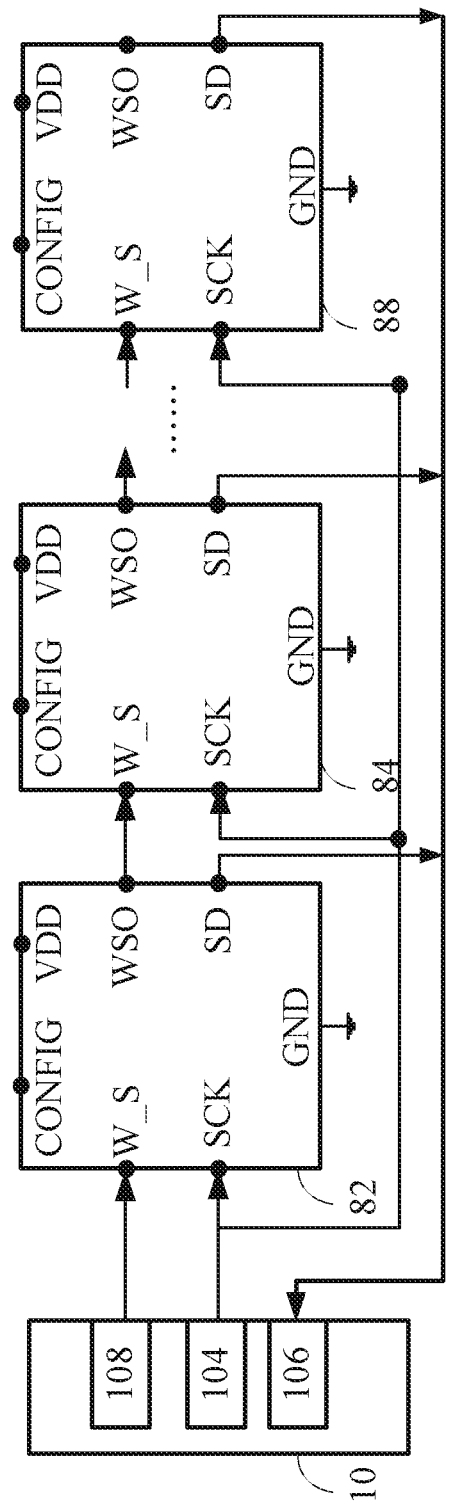
FIG. 8 illustrates a schematic diagram of a TDM transmission circuit.

FIG. 8 illustrates a schematic diagram of a time division multiplexing (TDM) transmission circuit. The TDM transmission circuit includes a processing unit 10 and TDM audio chips 82, 84, and 88, in this embodiment, the TDM transmitting circuit takes three TDM audio chips as an example. It should be noted that TDM can transmit word select signals WS to W_S pins of the next stages via a WSO pin of the present stage; thus, a number of TDM audio chips in the TDM transmitting circuit can be determined according to requirement of the audio channels.

Figure 9:
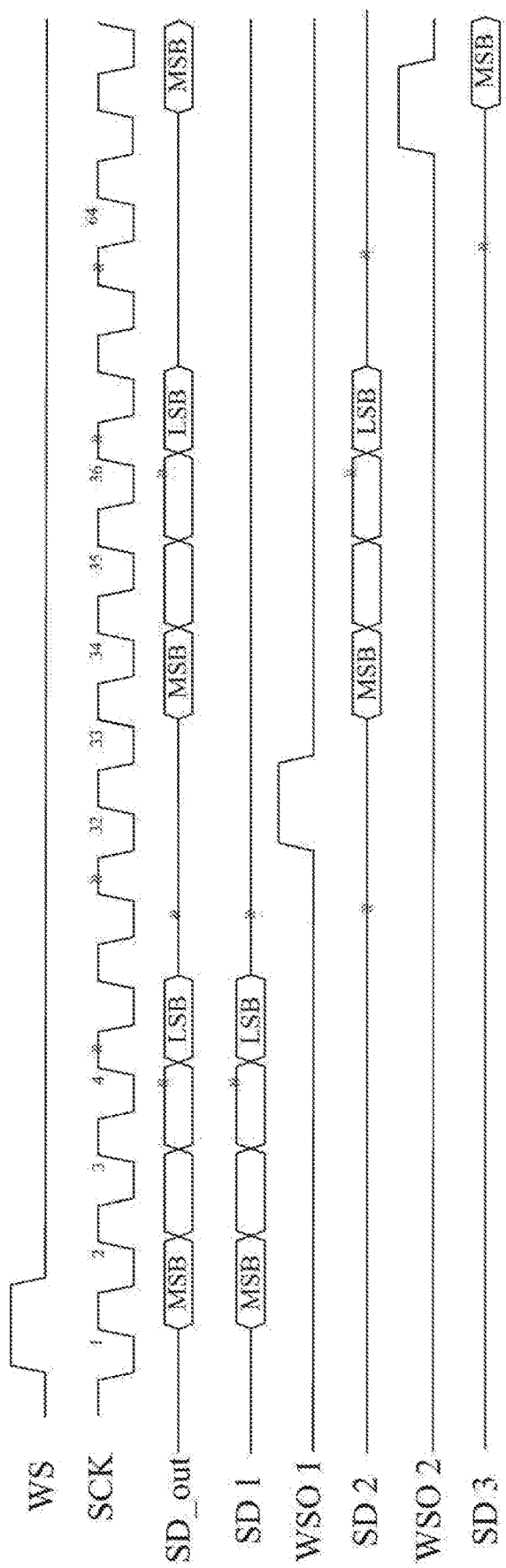
FIG. 9 illustrates a signal sequence diagram of the TDM transmission circuit shown in FIG. 8.

In the TDM transmitting circuit, the processing unit 10 also has a clock signal port 104, an audio data port 106, and a W_S port 108. The clock signal port 104 of the processing unit 10 transmits clock signals to SCK pins of the TDM audio chips 82, 84, and 88. The processing unit 10 transmits the word select signal WS to the W_S pin of the TDM audio chip 82, and the TDM audio chip 82 transmits the word select signal WS to the W_S pin of the next stage of the TDM audio chip 84 via the WSO pin. The TDM audio chip 84 transmits the word select signal WS to the W_S pin of the next stage of the TDM audio chip 88 via the WSO pin, and so on. This way, when the TDM transmitting circuit has more than three TDM audio chips, the W_S pin of the TDM audio chip receives the word select signal WS transmitted by the previous stage WSO Please refer to FIG. 9, which illustrates a signal sequence diagram of the TDM transmission circuit shown in FIG. 8. The processing unit 10 outputs the word select signal WS and the clock signal SCK. An SD pin of the TDM audio chip 82 outputs audio data SD1. A WSO pin of the TDM audio chip 82 transmits a W_S output signal WSO1 to a W_S pin of the TDM audio chip 84. An SD pin of the TDM audio chip 84 outputs audio data SD2. A WSO pin of the TDM audio chip 84 transmits the W_S output signal WSO2 to the W_S pin of the TDM audio chip 88. An SD pin of the TDM audio chip 84 outputs audio data SD3. Thus, an audio data SD_out is received by the audio data port 106 of the processing unit 10.

Figure 10:
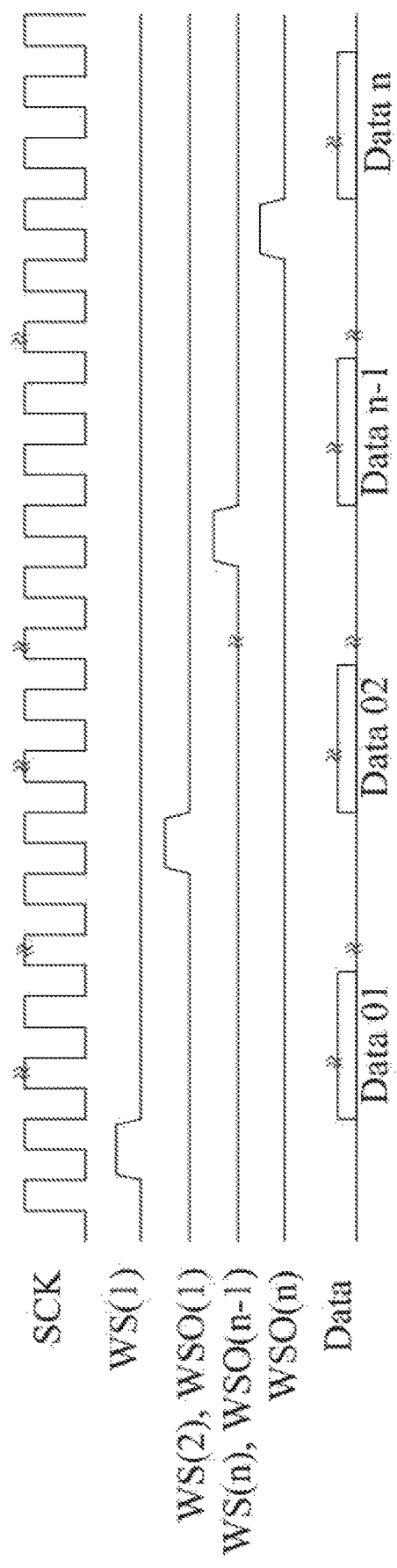
FIG. 10 illustrates the signal sequence diagram of the TDM transmission circuit having a plurality of TDM transmission chips connected in series.

FIG. 10 illustrates the signal sequence diagram of the TDM transmitting circuit which has n TDM audio chips. When n=1 or n=2, clock cycle is 64. When n=1, signal WS(2) will not output a high voltage potential; thus, Data 02 will not output a valid signal. When n=3 or n=4, clock cycle is 128. When n=3, signal WS(4) will not output a high voltage potential; thus, Data 04 will not output a valid signal. When n=5 to 8, clock cycle is 256. When n≠8, signal WS(n+1) will not output a high voltage potential; thus, Data (n+1) will not output a valid signal. When n=9 to 16, clock cycle is 512. Signal WS(n+1) will not output a high voltage potential; thus, Data (n+1) will not output a valid signal in remaining period. The signal sequence diagram of the TDM transmitting circuit shown in FIG. 10 is only an example. A skilled person in the art can obtain a TDM transmitting circuit with different numbers of TDM audio chips based on the transmission principle of TDM within the scope of the present disclosure.

Figure 11:
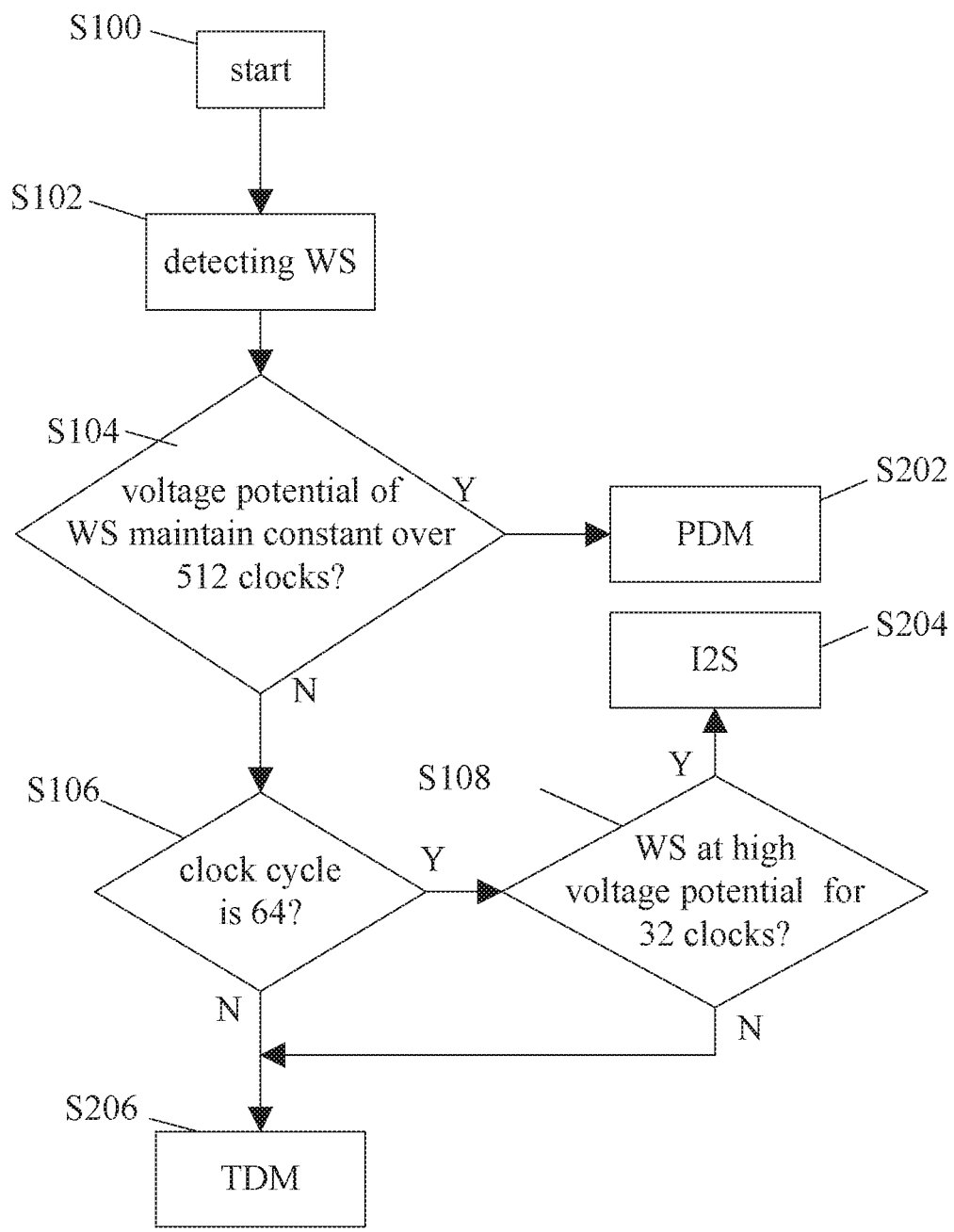
FIG. 11 illustrates a flow chart of a method for detecting audio interface of the present disclosure.

FIG. 11 illustrates a flow chart of a method for detecting audio interface of the present disclosure. Step S100 represents the start of audio protocol detection when the processing unit 10 receives audio data. In step S102, the word select signal WS is detected. In step S104, whether a voltage potential of the word select signal WS maintains constant for 512 clocks is detected.

It means whether the word select signal WS is maintained at a high voltage potential or maintained at a low voltage potential for more than 512 clocks. If so, it means that the audio data does not need the word select signal WS to select the channel, so the audio data received by the processing unit 10 is transmitted through the PDM audio transmission protocol. Therefore, if the word select signal WS has no voltage potential variation over 512 clocks, step S202 is implemented. If the voltage potential of the word select signal WS changes within a specific duration (such as 64, 128, 256, 512, or other specific clocks), step S106 is implemented. When audio data is transmitted using the PDM protocol, the W_S of the processing unit 10 can be set at a constant high voltage potential or a constant low voltage potential according to circuit design requirements. In the step S104, detecting whether a voltage potential of the word select signal WS maintains constant for 512 clocks is an example instead of intending to limit the present disclosure. According to the circuit design requirements, any method which can detect whether the WS maintains constant for a certain duration to know that the audio data received by the processing unit 10 is transmitted by the PDM audio transmission protocol falls within the scope of the present disclosure.

If it is determined in step S104 that the audio data received by the processing unit 10 is not transmitted by the PDM audio transmission protocol, step S106 is implemented. Step S106 detects whether the clock cycle is 64 clocks. In detail, the difference between the I2S audio transmission protocol and the TDM audio transmission protocol is that the I2S audio transmission protocol can only transmit audio data via two channels, and both the left and right audio signals occupy 32 clocks alternately. Thus, the clock cycle of the I2S audio transmission protocol is 64 clocks. The TDM audio transmission protocol can connect up to 16 TDM audio chips in series. That is, the TDM audio transmission protocol can transmit 16 channels of audio data at a same time. When the audio transmission protocol transmits audio data of 1 to 2 channels via TDM audio transmission protocol, the clock cycle is 64 clocks. When the audio transmission protocol transmits audio data of 3 to 4 channels, the clock cycle is 128 clocks. When the audio transmission protocol transmits audio data of 5 to 8 channels, the clock cycle is 256 clocks. When the audio transmission protocol transmits audio data of 9 to 16 channels, the clock cycle is 512 clocks. Therefore, step S106 detects whether the clock cycle of the received audio data is 64 clocks. If so, the audio data may be transmitted through either the I2S audio transmission protocol or the TDM audio transmission protocol. As a result, step S108 is performed to further determine whether the audio data transmission is I2S. If not, the audio data is transmitted through the TDM audio transmission protocol, and step S206 is implemented.

Step S108 detects whether the word select signal WS is at a high voltage potential for 32 clocks or not. In the I2S audio transmission protocol, the word select signal WS will maintain at a high level of 32 clocks, then at a low level of 32 clocks, and then a high level of 32 clocks. High voltage potential and low voltage potential are maintained for 32 clocks alternately until audio data transmission is completed. However, in the TDM audio transmission protocol, the word select signal WS is only a short pulse and only outputs a high voltage potential for several clocks, which will not maintain the high voltage potential for 32 clocks as the word select signal WS in the I2S audio transmission protocol. Therefore, when step S108 does detect that the voltage potential of the word select signal WS is at the high voltage potential for 32 clocks, the audio data is transmitted through the I2S audio transmission protocol, and step S204 is then performed. If not, the audio data is transmitted through the TDM audio transmission protocol, and step S206 is then implemented.

In step S202, the audio transmission protocol is switched to the PDM audio transmission protocol. In step S204, the audio transmission protocol is switched to the I2S audio transmission protocol. Step S206 is to switch the audio transmission protocol to a TDM audio transmission protocol.

Chips of present technologies with different audio interfaces require different circuit packaging processes. Through the device and method for detecting audio interface of the present disclosure, the processing unit can determine the type of transmission protocol used to transmit the received audio data through changes in signal potentials of the word select signal (or W_S pin). Hence, the processing unit can simultaneously process audio data transmitted through the PDM, I2S, or TDM audio transmission protocols. Therefore, in a single circuit packaging process, it is possible to produce packaged circuits with three audio interfaces. This way, packaging processes of the chips can be reduced, production cost of electronic microphones is greatly reduced, and wiring areas required for the chips are reduced, thereby making the product smaller and more suitable for various lightweight portable electronic devices.

The above is only the preferred implementation of the present disclosure. It should be noted that, for a skilled person in the art, without departing from the aspects of the present disclosure, improvements and modifications can be obtained. These improvements and modifications also fall in the protected scope of the present disclosure.

What is claimed is:

1. A device for detecting an audio interface, comprising:
    a processing unit configured to generate a clock signal and a word select signal;
    a first audio interface transmitting circuit configured to generate a first audio data according to the clock signal and configured to transmit the first audio data to the processing unit in a first transmission protocol;
    a second audio interface transmitting circuit configured to generate a second audio data according to the clock signal and the word select signal and configured to transmit the second audio data to the processing unit in a second transmission protocol;
    a third audio interface transmitting circuit configured to generate a third audio data according to the clock signal and the word select signal and to transmit the third audio data to the processing unit in a third transmission protocol; and
    a detecting unit configured to generate a detection result according to the word select signal;
    wherein the detection result is the first transmission protocol and the processing unit is switched to the first audio interface transmitting circuit when the word select signal is maintained at a low voltage potential for a predetermined period or when the word select signal is maintained at a high voltage potential for the predetermined period;
    the detection result is the second transmission protocol and the processing unit is switched to the second audio interface transmitting circuit when a voltage potential of the word select signal changes in the predetermined period;
    the detection result is the third transmission protocol and the processing unit is switched to the third audio interface transmitting circuit when two adjacent rising edges or two adjacent falling edges of the word select signal are spaced for 64 clocks and the word select signal is maintained at the high voltage potential for 32 clocks;
    the detection result is the second transmission protocol and the processing unit is switched to the second audio interface transmitting when the two adjacent rising edges or the two adjacent falling edges of the word select signal are spaced for 64 clocks and the word select signal is not maintained at the high voltage potential for 32 clocks; and
    the detection result is the second transmission protocol and the processing unit is switched to the second audio interface transmitting when the two adjacent rising edges or the two adjacent falling edges of the word select signal are not spaced for 64 clocks.

2. The device for detecting the audio interface according to claim 1, wherein the first transmission protocol is pulse density modulation, and the second transmission protocol is time division multiplexing.

3. The device for detecting the audio interface according to claim 1, wherein the third transmission protocol is inter-integrated circuit (inter-IC) sound transmission.

4. The device for detecting the audio interface according to claim 1, wherein the predetermined period is 512 clocks.

5. A method for detecting an audio interface, configured to switch the audio interface by detecting a word select signal generated by a processing unit, comprising:
    step one: detecting the word select signal;
    step two: determining whether a voltage potential of the word select signal maintains constant for a predetermined period, and implementing a step three if so or implementing a step fourth if not;
    wherein the step three is switching the audio interface of the processing unit to a first audio interface transmitting circuit;
    the step four is switching the audio interface of the processing unit to a second audio interface transmitting circuit, and determining whether two adjacent rising edges of the word select signal are spaced for 64 clocks or two adjacent falling edges of the word select signal are spaced for 64 clocks; and
    if so and the word select signal is maintained at a high voltage potential for 32 clocks, the audio interface of the processing unit is switched to a third audio interface transmitting circuit, otherwise the audio interface of the processing unit is switched to the second audio interface transmitting circuit.

6. The method for detecting the audio interface according to claim 5, wherein the first audio interface transmitting circuit is a pulse density modulation circuit and the second audio interface transmitting circuit is a time division multiplexing circuit.

7. The method for detecting the audio interface according to claim 5, wherein the third audio interface transmitting circuit is inter-integrated circuit (inter-IC) sound transmission.

8. The method for detecting the audio interface according to claim 5, wherein the predetermined period is 512 clocks.

* * * * *